(12) United States Patent
Yoon et al.

(10) Patent No.: US 8,682,107 B2
(45) Date of Patent: Mar. 25, 2014

(54) APPARATUS AND METHOD FOR CREATING 3D CONTENT FOR ORIENTAL PAINTING

(75) Inventors: Seung-Uk Yoon, Bucheon-si (KR);
Seong-Jae Lim, Gwangiu (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 167 days.

(21) Appl. No.: 13/331,046

(22) Filed: Dec. 20, 2011

(65) Prior Publication Data

US 2012/0163733 A1    Jun. 28, 2012

(30) Foreign Application Priority Data

Dec. 22, 2010  (KR) .................. 10-2010-0132877
May 18, 2011  (KR) .................. 10-2011-0046755

(51) Int. Cl.
*G06K 9/36* (2006.01)
*G06K 9/00* (2006.01)

(52) U.S. Cl.
USPC ........................................ 382/286; 382/154

(58) Field of Classification Search
USPC .......... 382/154, 284, 286, 294; 345/419, 426, 345/430, 441, 582
See application file for complete search history.

(56) References Cited

U.S. PATENT DOCUMENTS

| | | | | |
|---|---|---|---|---|
| 7,889,913 | B2 * | 2/2011 | Wells | 382/154 |
| 8,086,060 | B1 * | 12/2011 | Gilra et al. | 382/254 |
| 8,406,510 | B2 * | 3/2013 | Angot et al. | 382/154 |
| 8,406,548 | B2 * | 3/2013 | Ali et al. | 382/254 |
| 2004/0027346 | A1 | 2/2004 | Naske | |
| 2006/0033750 | A1 * | 2/2006 | Wang | 345/616 |
| 2007/0024614 | A1 * | 2/2007 | Tam et al. | 345/419 |
| 2007/0036427 | A1 * | 2/2007 | Nakamura et al. | 382/154 |
| 2007/0070066 | A1 * | 3/2007 | Bakhash | 345/419 |
| 2008/0246757 | A1 * | 10/2008 | Ito | 345/419 |
| 2011/0157160 | A1 * | 6/2011 | Ushiki et al. | 345/419 |
| 2011/0249007 | A1 * | 10/2011 | Kuster et al. | 345/441 |
| 2012/0092338 | A1 * | 4/2012 | Ogishima et al. | 345/419 |

FOREIGN PATENT DOCUMENTS

KR    10-2007-0095259    9/2007
KR    10-2009-0114529    11/2009

OTHER PUBLICATIONS

Lee et al Real-Time 3D Artistic Rendering System, Knowledge-Based Intelligent Information and Engineering Systems Lecture Notes in Computer Science vol. 3683, 2005, pp. 456-462.*
Subbarao, M.; Gurumoorthy, N., "Depth recovery from blurred edges," Computer Vision and Pattern Recognition, 1988. Proceedings CVPR '88., Computer Society Conference on , vol., No., pp. 498,503, Jun. 5-9, 1988.*

* cited by examiner

*Primary Examiner* — Andrae S Allison
(74) *Attorney, Agent, or Firm* — Staas & Halsey LLP

(57) ABSTRACT

Disclosed herein are an apparatus and method for creating 3D content for an Oriental painting. The apparatus includes a 2D image analysis unit, a 3D information extraction unit, a content creation unit, and a 3D content conversion unit. The 2D image analysis unit receives previous knowledge information, and analyzes 2D information about at least one of an empty space, light and shading, and a composition of an image of the Oriental painting based on the previous knowledge information. The 3D information extraction unit extracts 3D information about at least one of a distance, a depth, a viewpoint, and a focus of the Oriental painting image. The content creation unit creates content for the Oriental painting image based on the analysis information and the 3D information. The 3D content conversion unit converts the content for the Oriental painting image into 3D content based on the 3D information.

10 Claims, 12 Drawing Sheets

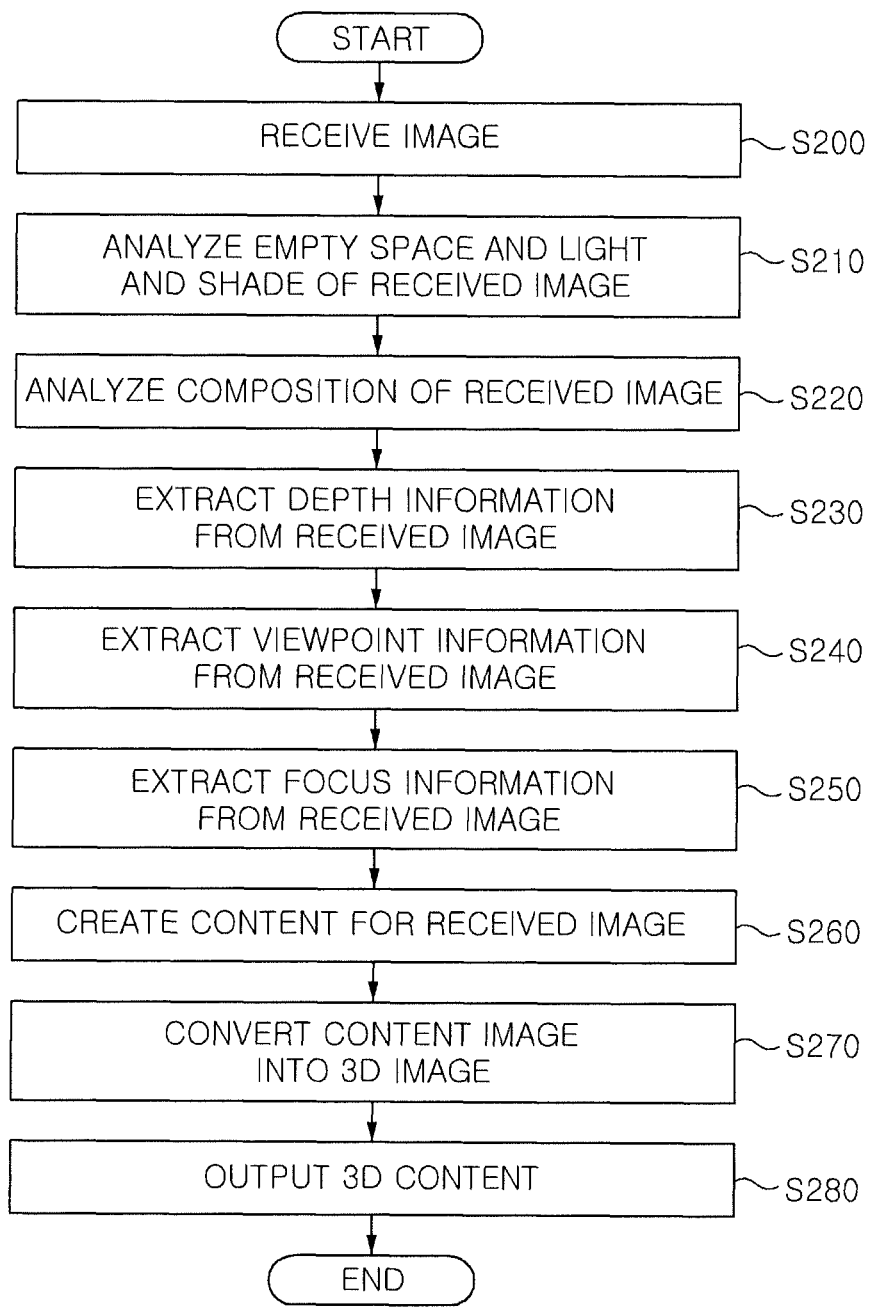

APPARATUS AND METHOD FOR CREATING 3D CONTENT FOR ORIENTAL PAINTING

CROSS REFERENCE TO RELATED APPLICATIONS

This application claims the benefit of Korean Patent Application No. 10-2010-0132877, filed on Dec. 22, 2010, and Korean Patent Application No. 10-2011-0046755, filed on May 18, 2011, respectively, which are hereby incorporated by reference in their entirety into this application.

BACKGROUND OF THE INVENTION

1. Technical Field

The present invention relates generally to an apparatus and method for creating three-dimensional (3D) content for an Oriental painting and, more particularly, to an apparatus and method for creating 3D content for an Oriental painting, which convert a two-dimensional (2D) image of the Oriental painting (e.g., a classical black-and-white drawing) into a 3D image based on 3D information included in a black-and-white drawing image and create 3D content suitable for 3D display using the 3D information.

2. Description of the Related Art

With the attention that 3D TV and 3D display devices are attracting recently, there is increased interest in the production of 3D content. Accordingly, if cultural contents may be stereoscopically created by converting Oriental paintings such as classical black-and-white drawings, traditional pictures may be interpreted in a modem fashion, cultural contents may be grafted into media arts, and application to various fields are enabled from the viewpoint of edutainment.

Conventional attempts may include, in terms of media arts, the work of adding animation effects to a Korean classical painting by extracting the parts of the Korean classical painting that are amenable to being animated and editing images using design work, and displaying the painting on an LCD disposed on the picture scrolls of an 8-panel folding screen. This technique, however, does not take a 3D display device into consideration, and the main object thereof is to edit, process, and display input data using computer graphics technology. Accordingly, in order to reproduce the input data using a 3D display, there arise the problems that an expert must perform additional manual work and that additional time and cost are required.

Furthermore, there are the tasks of converting a common 2D image into a 3D image. A method using computer vision technology derives depth information from near and far information and lost points within a 2D image, generate a 3D effect based on the depth information, and reproduce a 3D image on a 3D display.

However, whether to perform conversion and the performance of conversion depend on characteristics of the image because computer vision techniques are applied to common images. The most significant disadvantage is that it is difficult to apply the computer vision technique to a classical black-and-white drawing using three distance perspective representation, the light and shading of Indian ink and empty space because depth information are derived from 1-dot perspective representation (i.e., European perspective representation). That is, the conventional approach to common images is not appropriate for the 3D conversion of a classical black-and-white drawing because the characteristics of only the classical black-and-white drawing do not appear in a common image.

SUMMARY OF THE INVENTION

Accordingly, the present invention has been made keeping in mind the above problems occurring in the prior art, and an object of the present invention is to provide an apparatus and method for creating 3D content for an Oriental painting, which can produce 3D content suitable for a 3D display by stereoscopically converting an image of an Oriental painting based on specific information included in the Oriental painting.

Another object of the present invention is to provide an apparatus and method for creating 3D content for an Oriental painting, which enables an Oriental painting to be interpreted in a modern and stereoscopic manner by producing 3D content for an Oriental painting using a computer vision technique.

In order to accomplish the above objects, the present invention provides an apparatus for creating 3D content for an Oriental painting, the apparatus including a 2D image analysis unit for receiving previous knowledge information used for analyzing the Oriental painting, and analyzing 2D information about at least one of an empty space, light and shading, and a composition of an image of the Oriental painting based on the previous knowledge information; a 3D information extraction unit for extracting 3D information about at least one of a distance, a depth, a viewpoint, and a focus of the Oriental painting image based on the previous knowledge information and the analysis information of the 2D image analysis unit; a content creation unit for creating content for the Oriental painting image based on the analysis information and the 3D information; and a 3D content conversion unit for converting the content for the Oriental painting image into 3D content by applying the 3D information to image information about the content for the Oriental painting image.

The 2D image analysis unit may extract the information about the empty space and the light and shading from the Oriental painting image, and analyze the composition of the Oriental painting image based on the information about the empty space and the light and shading.

The 3D information extraction unit may detect objects within the Oriental painting image based on the information about the empty space and the composition of the Oriental painting image, and extract the information about the viewpoint within the Oriental painting image by ascertaining a distance relationship between the objects.

The 3D information extraction unit may extract depth information about the objects within the Oriental painting image based on the information about the light and shading of the Oriental painting image.

The 3D information extraction unit may extract the information about the focus within the Oriental painting image based on the information about the light and shading of the Oriental painting image.

The previous knowledge information may include at least one of empty space processing information, basic composition information, and viewpoint processing information necessary to interpret the Oriental painting.

The content creation unit may include a subtitle insertion unit for inserting at least one piece of subtitle information, selected from among music information, analysis information, and work explanation information, related to the Oriental painting image, into the Oriental painting image; and an audio insertion unit for inserting at least one piece of audio information, selected from among music and voice data of a commentator, related to the Oriental painting image, into the content for the Oriental painting image.

The content creation unit may further include a viewpoint control unit for controlling the viewpoint information about the Oriental painting image.

In order to accomplish the above objects, the present invention provides a method for creating 3D content for an Oriental painting, the method including receiving previous knowledge information used for analyzing the Oriental painting, and analyzing 2D information about at least one of an empty space, light and shading, and a composition of an image of the Oriental painting based on the previous knowledge information; extracting 3D information about at least one of a distance, a depth, a viewpoint, and a focus of the Oriental painting image based on the previous knowledge information and the analysis information about the Oriental painting image; creating content for the Oriental painting image based on the analysis information and the 3D information; and converting the content for the Oriental painting image into 3D content by applying the 3D information to image information about the content for the Oriental painting image.

The analyzing 2D information may include extracting the information about the empty space and the light and shading from the Oriental painting image; and analyzing the composition of the Oriental painting image based on the information about the empty space and the light and shading.

The extracting 3D information may include detecting objects within the Oriental painting image based on the information about the empty space and the composition of the Oriental painting image; and extracting the information about the viewpoint within the Oriental painting image by ascertaining a distance relationship between the objects.

The extracting 3D information may include extracting depth information about the objects within the Oriental painting image based on the information about the light and shading of the Oriental painting image.

The extracting 3D information may include extracting the information about the focus within the Oriental painting image based on the information about the light and shading of the Oriental painting image.

The previous knowledge information may include at least one of empty space processing information, basic composition information, and viewpoint processing information necessary to interpret the Oriental painting.

The creating content for the Oriental painting image may include inserting at least one piece of subtitle information, selected from among music information, analysis information, and work explanation information, related to the Oriental painting image, into the Oriental painting image; and inserting at least one piece of audio information, selected from among music and voice data of a commentator, related to the Oriental painting image.

The creating content for the Oriental painting image may include controlling the viewpoint information about the Oriental painting image, into the content for the Oriental painting image.

BRIEF DESCRIPTION OF THE DRAWINGS

The above and other objects, features and advantages of the present invention will be more clearly understood from the following detailed description taken in conjunction with the accompanying drawings, in which:

FIG. 7 is a flowchart illustrating a method of creating the 3D content of an Oriental painting according to the present invention.

DESCRIPTION OF THE PREFERRED EMBODIMENTS

The present invention provides an apparatus and method for creating 3D content using a 2D Oriental painting image, and, in particular, an apparatus and method for stereoscopically restoring an Oriental painting by extracting depth information and multi-viewpoint information from clues included in a classical black-and-white drawing and then converting a 2D painting into a 3D painting.

Embodiments of the present invention are described with reference to the accompanying drawings. Although embodiments will be chiefly described based on the black-and-white drawings of Oriental paintings, they are not limited thereto.

Figure 1:
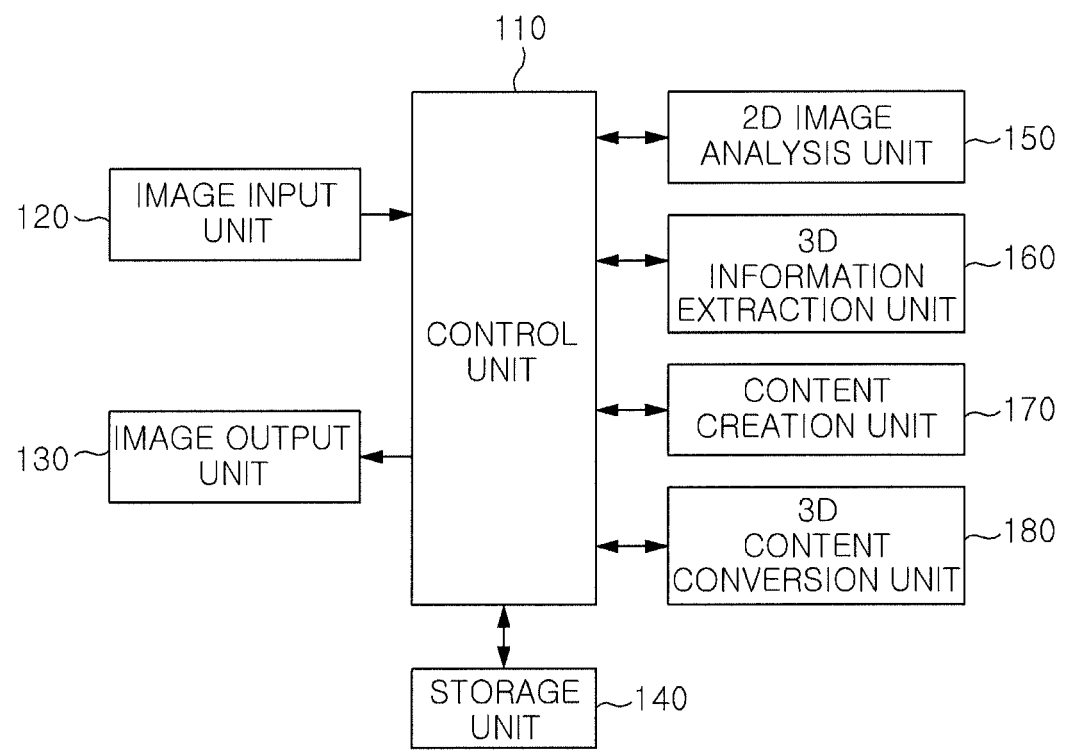
FIG. 1 is a block diagram illustrating the configuration of an apparatus for creating 3D content for an Oriental painting according to the present invention.

FIG. 1 is a block diagram illustrating the configuration of an apparatus for creating 3D content for an Oriental painting according to the present invention.

As shown in FIG. 1, the apparatus for creating 3D content for an Oriental painting (hereinafter referred to as the '3D content creating apparatus') according to the present invention includes a control unit 110, an image input unit 120, an image output unit 130, a storage unit 140, a 2D image analysis unit 150, a 3D information extraction unit 160, a content creation unit 170, and a 3D content conversion unit 180. The control unit 110 controls the operation of the elements of the 3D content creating apparatus.

The image input unit 120 is means for receiving a 2D Oriental painting image. The image output unit 130 is means for outputting 3D content that is generated by the 3D content creating apparatus using the 2D Oriental painting image received via the image input unit 120.

The 2D image analysis unit 150 analyzes the 2D Oriental painting image. The 2D image analysis unit 150 analyzes the empty spaces and light and shading of the 2D Oriental painting image. Furthermore, the 2D image analysis unit 150 analyzes the composition of the 2D Oriental painting image based on the empty spaces and light and shading of the 2D Oriental painting image, and detects one or more objects included in the 2D Oriental painting image. The detailed configuration of the 2D image analysis unit 150 will be described below with reference to FIG. 2.

The 3D information extraction unit 160 extracts information about the distance between the objects within the 2D Oriental painting image, depth information, viewpoint information, and focus information based on the analysis results of the 2D image analysis unit 150 and previous knowledge about the 2D Oriental painting image that that had been input. The detailed configuration of the 3D information extraction unit 160 will be described below with reference to FIG. 4.

The content generation unit 170 corrects parts of the 2D Oriental painting image based on the 3D information extracted by the 3D information extraction unit 160, or creates content for the 2D Oriental painting image by inserting music, analysis information, and explanations of the work in the form of subtitles. The detailed configuration of the content creation unit 170 will be described below with reference to FIG. 6.

The 3D content conversion unit 180 converts an image of the created content into a 3D image by applying the 3D information about the 2D Oriental painting image to the created content.

In other words, the 3D content conversion unit 180 converts the content, created by the content creation unit 170, into image information so that the content can be reproduced in a 3D display device. For example, the 3D content conversion unit 180 converts the created content, edited so that it may use a multi-viewpoint effect in a multi-viewpoint display device, into a format supported by the display.

The storage unit 140 stores the 2D Oriental painting image received via the image input unit 120. Furthermore, the storage unit 140 stores the 3D information of the 2D Oriental painting image, extracted by the 3D information extraction unit 160, as a result of the 2D Oriental painting image of the analysis of the 2D image analysis unit 150, and stores the content created by the operation of the content creation unit 170 and the 3D content conversion unit 180.

Figure 2:
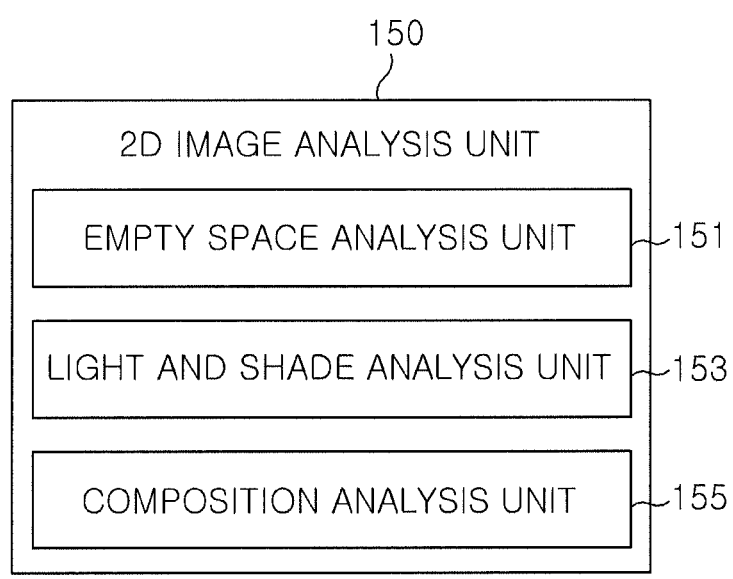
FIG. 2 is a block diagram illustrating the detailed configuration of a 2D image analysis unit according to the present invention.

FIG. 2 is a block diagram illustrating the detailed configuration of the 2D image analysis unit 150 according to the present invention. As shown in FIG. 2, the 2D image analysis unit 150 includes an empty space analysis unit 151, a light and shading analysis unit 153, and a composition analysis unit 155.

The empty space analysis unit 151 analyzes at least one empty space region within the received 2D Oriental painting image.

A region covering a major portion of a painting, such as the sky, water, or the earth, is mainly set as empty space. Furthermore, the empty space plays an important role of detecting an object. Accordingly, the empty space may be used as important information that distinguishes an object, drawn in the Oriental painting, from a background region.

The light and shading analysis unit 153 analyzes light and shading information within the received 2D Oriental painting image.

The composition analysis unit 155 analyzes the entire composition of the Oriental painting based on the empty space information and the light and shading information about the Oriental painting.

The information obtained by the analysis of the empty space analysis unit 151, the light and shading analysis unit 153, and the composition analysis unit 155 is stored in the storage unit 140, and may be additionally used in the subsequent process of creating content.

If previous knowledge of an Oriental painting work is necessary, corresponding information may also be additionally input to the 2D image analysis unit 150 and then be used to perform analysis.

The detailed operation of the empty space analysis unit 151, the light and shading analysis unit 153, and the composition analysis unit 155 shown in FIG. 2 will now be described with reference to FIGS. 3A to 3C.

Figure 3A:
FIGS. 3A to 3C are diagrams illustrating the operation of the 2D image analysis unit according to the present invention.

FIG. 3A shows an example in which a composition has been analyzed based on an empty space within a 2D Oriental painting image. In FIG. 3A, a part related to the earth is set as an empty space. The empty space functions to distinguish the earth from people.

Accordingly, the 2D image analysis unit analyzes the empty space based on the 2D Oriental painting image of FIG. 3A, and also detects objects (i.e., people) around the empty space.

Here, the 2D image analysis unit ascertains the symmetry and composition of the Oriental painting based on the empty space information and the object information. In particular, in FIG. 3A, the 2D image analysis unit ascertains that the Oriental painting has a square composition based on the empty space.

Figure 3B:

FIG. 3B shows an example in which snow is represented using an empty space within a 2D Oriental painting image.

A method of representing snow, fallen in winter, using an empty space, as shown in FIG. 3B, is called an empty space leaving method which is one of the black-and-white drawing methods. The empty space leaving method is a method of drawing portions without snow so that snow conspicuously seems to have fallen on the white background of a painting, unlike a partial method of directly painting a part on which snow has fallen white in a Western painting.

If previous knowledge of an Oriental painting work is necessary as described above, the corresponding information may be additionally input to the 2D image analysis unit, and then be used for analyzing the corresponding Oriental painting.

Accordingly, the 2D image analysis unit extracts the empty space information from the Oriental painting of FIG. 3B so that other objects (e.g., a house and a tree) can be subsequently distinguished from snow.

Figure 3C:

FIG. 3C shows an example in which an object is represented using the light and shading of Indian ink.

From the painting of FIG. 3C, it can be seen that bamboo plants placed at the front and back are represented using the light and shading of Indian ink. That is, the leaves of a bamboo plant placed at the front are darkly represented, and the leaves of a bamboo plant placed at the back are obscurely represented.

The 2D image analysis unit extracts information that can be used to distinguish the bamboo placed at the front from the bamboo placed at the back, by analyzing light and shading (e.g., the light and shading of Indian ink) within the 2D Oriental painting image of FIG. 3C.

Figure 4:
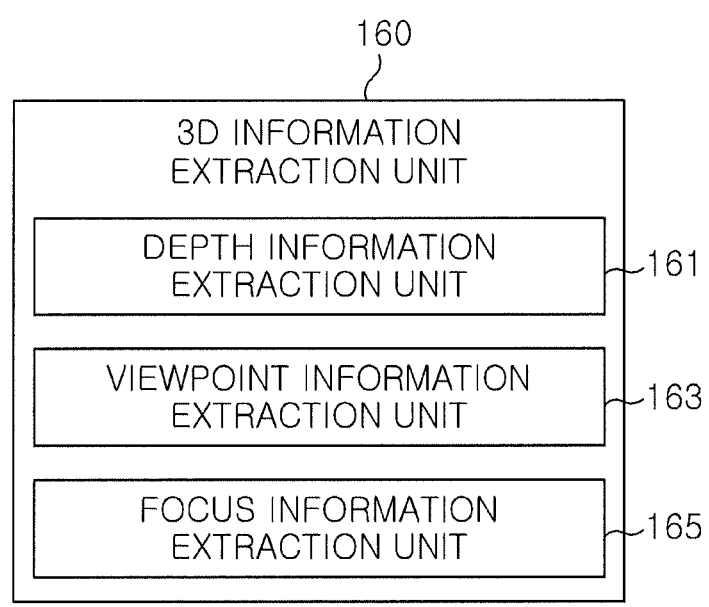
FIG. 4 is a block diagram illustrating the detailed configuration of a 3D information extraction unit according to the present invention.

FIG. 4 is a block diagram illustrating the detailed configuration of the 3D information extraction unit 160 according to the present invention.

As shown in FIG. 4, the 3D information extraction unit 160 includes a depth information extraction unit 161, a viewpoint information extraction unit 163, and a focus information extraction unit 165.

The depth information extraction unit 161 extracts depth information about the 2D Oriental painting image based on the analysis results of the light and shading analysis unit.

The viewpoint information extraction unit 163 extracts viewpoint information about the 2D Oriental painting image based on the analysis results of the composition analysis unit. For example, the viewpoint information extraction unit 163 may ascertain the distance relationship between objects within the painting based on previous knowledge of the 2D Oriental painting image, and extract multi-viewpoint information.

If the multi-viewpoint information extracted by the viewpoint information extraction unit 163 is used, the 3D effect may be reproduced by a 3D display device not only in a horizontal direction but also in a vertical direction.

The focus information extraction unit 165 extracts a focused position from the 2D Oriental painting image by analyzing the 2D Oriental painting image.

The information extracted by the depth information extraction unit 161, the viewpoint information extraction unit 163, and the focus information extraction unit 165 is stored in the storage unit, and is used to add the 3D effect in the 3D content conversion unit.

The operation of the depth information extraction unit 161, the viewpoint information extraction unit 163, and the focus information extraction unit 165 will now be described in detail with reference to FIGS. 5A to 5D.

Figure 5A:
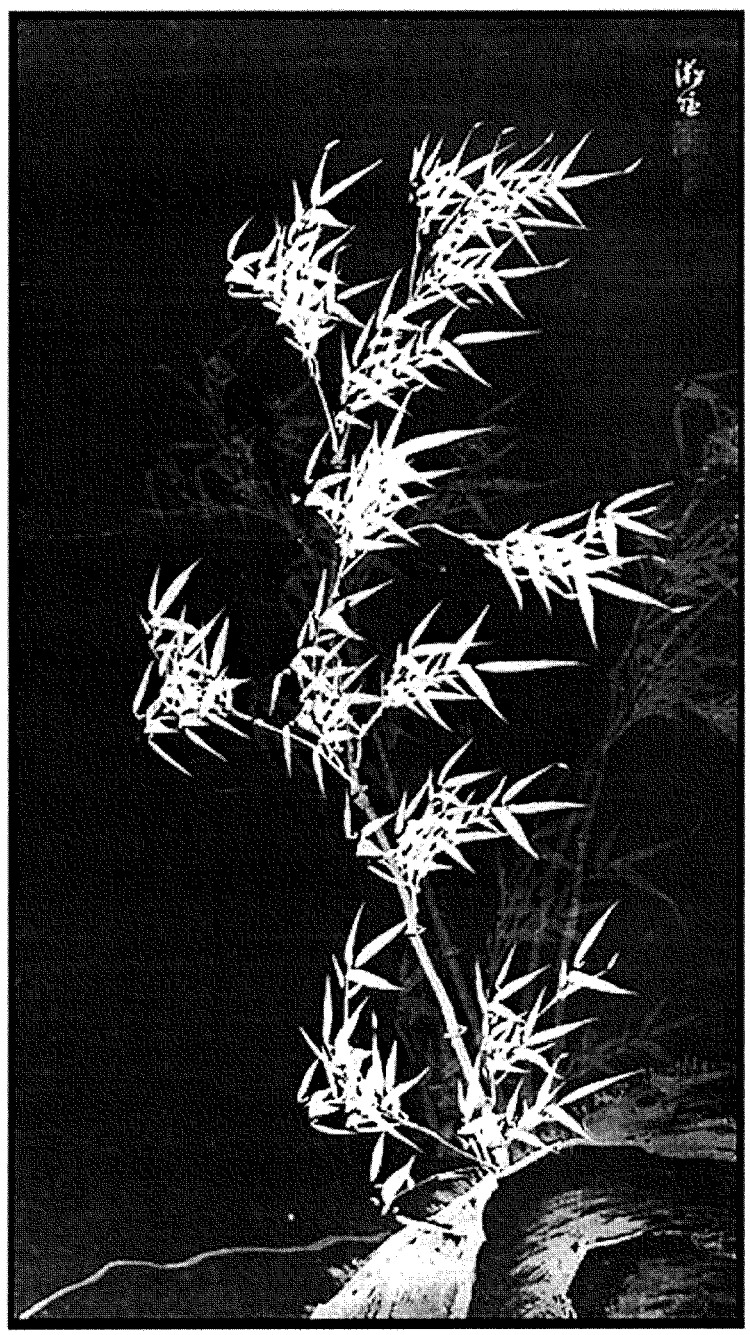
FIGS. 5A to 5D are diagrams illustrating the operation of the 3D information extraction unit according to the present invention.

FIG. 5A is a diagram illustrating the operation of extracting depth information.

The most basic information of the analysis information about the 2D Oriental painting image, obtained by the 2D image analysis unit, is light and shading information. In general, a dark Indian ink line indicates a close object, and an obscure or light Indian ink line indicates an object placed in the rear. Alternatively, a dark Indian ink line may indicate an object in focus, and an obscure Indian ink line may indicate that an object is out of focus.

Accordingly, the depth information extraction unit extracts depth information about a received image based on the light and shading information.

FIG. 5A shows an image based on the depth information extracted from the image of FIG. 3C by the depth information extraction unit. In FIG. 5A, the distance relationship is represented using a grayscale image having pixel values ranging from 0 to 255. Here, an object having a color closer to white 255 is an object placed in the front, and an object having a color closer to black 0 is an object placed in the rear.

Figure 5B:

FIG. 5B is a diagram illustrating the operation of extracting viewpoint information.

As shown in FIG. 5B, in the Oriental painting, the direction along which a person's gaze moves is basically directed from the upper right side to the lower left side. Accordingly, if a distant object or a hill and a river are placed on the top right side and a close object or a hill and a river are placed on the bottom left side, objects placed in the front chiefly appear from the top to the bottom.

FIG. 5B shows the movement of a viewpoint in two diagonal directions. That is, the movement of a first viewpoint is directed from the top right side to the bottom left side, and the movement of a second viewpoint is directed from the left side to the bottom right side. A road winding and bending from the back to the front can be represented using the changing position of the viewpoint.

Accordingly, the viewpoint information extraction unit extracts movement information about the two viewpoints from the 2D Oriental painting image of FIG. 5B based on the analysis results of the 2D image analysis unit.

Figure 5C:
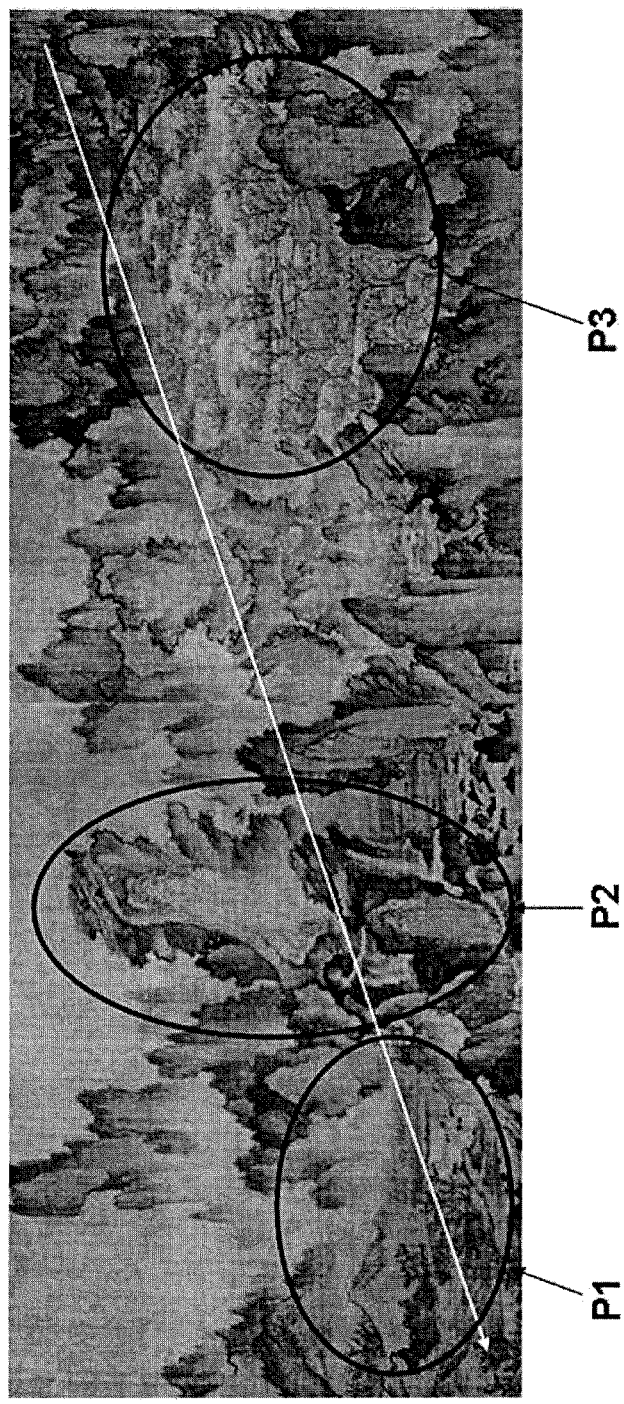

FIG. 5C is a diagram illustrating another operation of extracting viewpoint information.

The perspective representation of a Western painting is based on an 1-dot perspective representation in which a viewer is one in number and does not move. That is, in an 1-dot perspective representation, a single viewer or painter exists outside a screen, and then the viewer or painter draws what he sees from that viewpoint. With the development of abstract painting, Picasso who is a Cubism painter draws all the shapes of an object which are viewed from several viewpoints. A common point in the previous paintings is that there is the assumption of a single viewpoint and a single viewer.

Unlike the above, in Oriental painting, there is a perspective representation called a three-distance perspective representation, which is also called high-distance perspective representation, deep-distance perspective representation, or flat-distance perspective representation. The high-distance perspective representation is a method of representing the viewpoint from which an object is viewed from the bottom to the top, the deep distance perspective representation is a method of representing the viewpoint from which an object is viewed from at a similar height, and the flat distance perspective representation is a method of representing the viewpoint from which an object is viewed from a higher place a lower place.

The 2D Oriental painting image of FIG. 5C includes the viewpoint from which an object is viewed from a lower place to a higher place, the viewpoint from which an object is viewed from at a similar height, and the viewpoint from which an object is viewed from a higher place a lower place.

That is, in FIG. 5C, P1 indicates the viewpoint from which an object is viewed from at a similar height, P2 indicates the viewpoint from which an object is viewed from a lower place to a higher place, and P3 indicates the viewpoint from which an object is viewed from a higher place a lower place.

Accordingly, the viewpoint information extraction unit extracts three pieces of information about the viewpoints P1, P2, and P3.

Figure 5D:
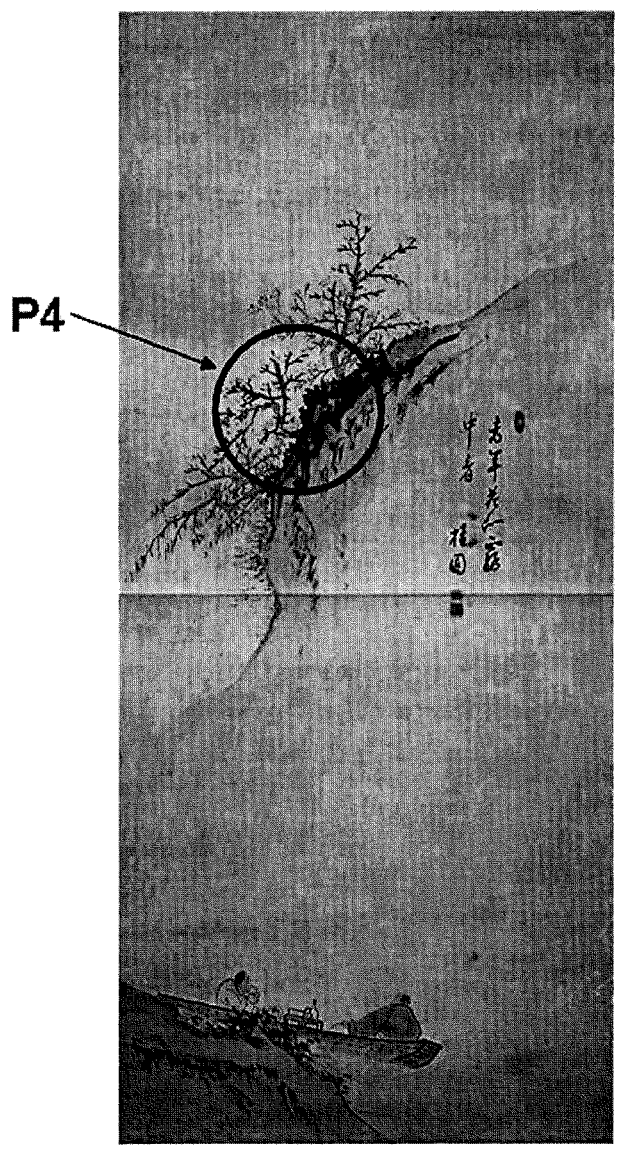

FIG. 5D is a diagram illustrating the operation of extracting focus information.

As described above, in Oriental painting, a focus may be represented using the light and shading of Indian ink.

In FIG. 5D, a hill at the center of the painting is focused using a dark Indian ink line, but the Indian ink line becomes gradually light toward the right side and the left side. Accordingly, the focus information extraction unit extracts focus information from a dark Indian ink portion P4 based on the light and shading information of Indian ink.

Figure 6:
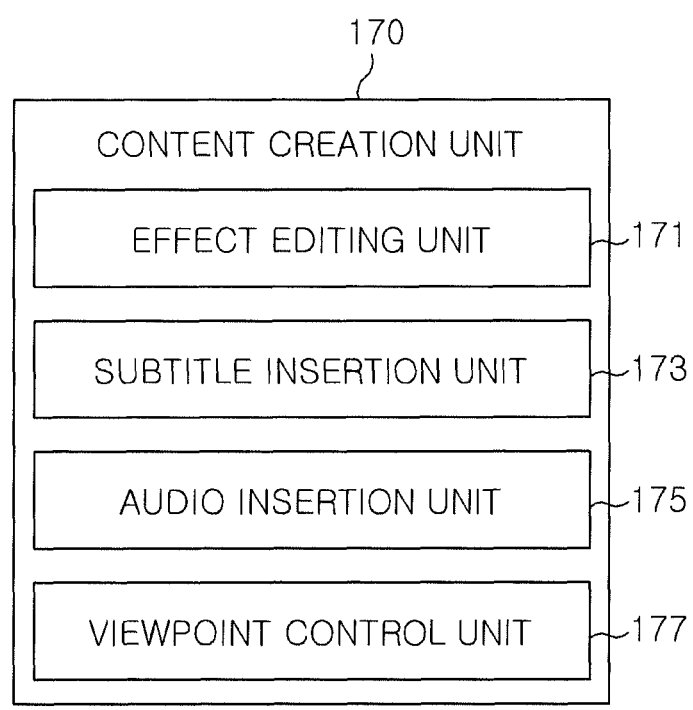
FIG. 6 is a block diagram illustrating the configuration of the content creation unit according to the present invention.

FIG. 6 is a block diagram illustrating the configuration of the content creation unit according to the present invention.

The content generation unit 170 creates content for the 2D Oriental painting image, and edits the created content based on 2D image analysis information and 3D information.

As shown in FIG. 6, the content creation unit 170 includes an effect editing unit 171, a subtitle insertion unit 173, an audio insertion unit 175, and a viewpoint control unit 177.

The effect editing unit 171 incorporates a specific effect into the entire or partial region of an Oriental painting image based on the 3D information (i.e., depth information, viewpoint information, and focus information) extracted by the 3D information extraction unit, and then edits the region.

The subtitle insertion unit 173 inserts music information, analysis information, and/or an explanation of a work, corresponding to the Oriental painting image, into the Oriental painting image as subtitles.

The audio insertion unit 175 inserts music and the voice data of a commentator, corresponding to the Oriental painting image, into the created content.

The viewpoint control unit 177 controls a viewpoint of the Oriental painting image by adding a multi-viewpoint function or by inserting only a binocular viewpoint function depending on the type of 3D display means for outputting the content.

Thereafter, the 3D content conversion unit may vary the 3D effect of the content, created based on the pieces of 3D information extracted by the 3D information extraction unit, for each unique part of the painting over time, or may add animation that changes depending on the viewpoint.

The operation of the 3D content creating apparatus according to the present invention will now be described.

FIG. 7 is a flowchart illustrating a method of creating 3D content for an Oriental painting according to the present invention.

As shown in FIG. 7, when a 2D Oriental painting image is received at step S200, the 3D content creating apparatus analyzes 2D image information (i.e., empty spaces and light and shading) about the 2D Oriental painting image at step S210. Here, the 3D content creating apparatus analyzes the composition of the 2D Oriental painting image based on the information about the empty spaces and the light and shading according to the results of the analysis at step S220.

Thereafter, the 3D content creating apparatus extracts 3D information about the 2D Oriental painting image. Here, the 3D content creating apparatus extracts depth information, viewpoint information, and focus information about the 2D Oriental painting image at steps S230, S240, and S250.

When the process of analyzing the 2D Oriental painting image and extracting the 3D information has completed, the 3D content creating apparatus creates content based on the analysis information and the extraction information at step S260.

The step S260 may include the process of additionally inserting subtitles, the process of inserting audio, and/or the process of controlling the viewpoint.

After the content has been generated at step S260, the 3D content creating apparatus converts an image of the content into a 3D image depending on the characteristics of 3D display means for outputting the content at step S270.

The content image may be converted based on the 3D information extracted at steps S230 to S250, in addition to the process of converting the content image into the 3D image. The 3D effect of the created content may be set so that it appears differently depending on each part of a painting over time, or animation may be added that varies depending on the viewpoint.

The 3D content generated at step S270 is output via 3D display means at step S280.

Although the apparatus and method for creating 3D content for an Oriental painting according to the present invention have been described above with reference to the illustrated drawings, the present invention is not limited to the embodiments disclosed in the specification and the drawings, but may be applied within the scope of the technical spirit.

As described above, according to the present invention, cultural content reproduced in a 3D display can be created by extracting 3D information included in a 2D classical black-and-white drawing image. The present invention is advantageous in that it enables everyone to appreciate a painting with curiosity by revealing the value of an old painting, which was considered to be static and difficult, using the 3D conversion of a black-and-white drawing that has never been attempted and by reproducing the old painting on a 3D display.

A conventional technique of converting a 2D image into a 3D image may be applied to only common images and may not be applied to an image having unique characteristics, such as a black-and-white drawing, because it is focused on automation. Furthermore, the conventional technique is disadvantageous in that it is difficult to add or maximize a specific effect according to the intention of its creator because a 3D image is automatically generated. In the present invention, however, low-quality 3D content is not automatically created by applying one rule to all works, but a 3D effect most suitable for each work is generated for the work by appropriately using the characteristics of only a black-and-white drawing and previous knowledge. Accordingly, high-quality 3D content can be produced which maximizes effects in terms of media arts and edutainment by interpreting a classical black-and-white drawing again and newly reproducing the classical black-and-white drawing using a 3D display.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. An apparatus for creating 3D content of an Oriental painting, the apparatus comprising:
a 2D image analysis unit for receiving previous knowledge information used for analyzing the Oriental painting, and analyzing 2D information about at least one of an empty space, light and shading, and a composition of an image of the Oriental painting based on the previous knowledge information;
a 3D information extraction unit, executed by a processor, for extracting 3D information about at least one of a distance, a depth, a viewpoint, and a focus of the Oriental painting image based on the previous knowledge information and the analysis information of the 2D image analysis unit;
a content creation unit for creating content for the Oriental painting image based on the analysis information and the 3D information; and
a 3D contents conversion unit for converting the content for the Oriental painting image into 3D content by applying the 3D information to image information about the content for the Oriental painting image,
wherein the 3D information extraction unit detects objects within the Oriental painting image based on the information about the empty space and the composition of the Oriental painting image, and extracts the information about the viewpoint within the Oriental painting image by ascertaining a distance relationship between the objects,
wherein the 3D information extraction unit extracts depth information about the objects within the Oriental painting image based on the information about the light and shading of the Oriental painting image, and
wherein the 3D information extraction unit extracts the information about the focus within the Oriental painting image based on the information about the light and shading of the Oriental painting image.

2. The apparatus as set forth in claim 1, wherein the 2D image analysis unit extracts the information about the empty space and the light and shading from the Oriental painting image, and analyzes the composition of the Oriental painting image based on the information about the empty space and the light and shading.

3. The apparatus as set forth in claim 1, wherein the previous knowledge information comprises at least one of empty space processing information, basic composition information, and viewpoint processing information necessary to interpret the Oriental painting.

4. The apparatus as set forth in claim 1, wherein the content creation unit comprises:
a subtitle insertion unit for inserting at least one piece of subtitle information, selected from among music information, analysis information, and work explanation information, related to the Oriental painting image, into the Oriental painting image; and
an audio insertion unit for inserting at least one piece of audio information, selected from among music and voice data of a commentator, related to the Oriental painting image, into the content for the Oriental painting image.

5. The apparatus as set forth in claim 4, wherein the content creation unit further comprises a viewpoint control unit for controlling the viewpoint information about the Oriental painting image.

6. A method for creating 3D content for an Oriental painting, the method comprising:
- receiving previous knowledge information used for analyzing the Oriental painting, and analyzing 2D information about at least one of an empty space, light and shading, and a composition of an image of the Oriental painting based on the previous knowledge information;
- extracting 3D information about at least one of a distance, a depth, a viewpoint, and a focus of the Oriental painting image based on the previous knowledge information and the analysis information about the Oriental painting image;
- creating content for the Oriental painting image based on the analysis information and the 3D information; and
- converting the content for the Oriental painting image into 3D content by applying the 3D information to image information about the content for the Oriental painting image,
- wherein the extracting 3D information comprises:
  - detecting objects within the Oriental painting image based on the information about the empty space and the composition of the Oriental painting image;
  - extracting the information about the viewpoint within the Oriental painting image by ascertaining a distance relationship between the objects;
  - extracting depth information about the objects within the Oriental painting image based on the information about the light and shading of the Oriental painting image; and
  - extracting the information about the focus within the Oriental painting image based on the information about the light and shading of the Oriental painting image.

7. The method as set forth in claim 6, wherein the analyzing 2D information comprises:
- extracting the information about the empty space and the light and shading from the Oriental painting image; and
- analyzing the composition of the Oriental painting image based on the information about the empty space and the light and shading.

8. The method as set forth in claim 6, wherein the previous knowledge information comprises at least one of empty space processing information, basic composition information, and viewpoint processing information necessary to interpret the Oriental painting.

9. The method as set forth in claim 6, wherein the creating content for the Oriental painting image comprises:
- inserting at least one piece of subtitle information, selected from among music information, analysis information, and work explanation information, related to the Oriental painting image, into the Oriental painting image; and
- inserting at least one piece of audio information, selected from among music and voice data of a commentator, related to the Oriental painting image, into the content for the Oriental painting image.

10. The method as set forth in claim 9, wherein the creating content for the Oriental painting image comprises controlling the viewpoint information about the Oriental painting image.

* * * * *